E. C. MORINE.
LENS MANUFACTURING.
APPLICATION FILED SEPT. 16, 1912.

1,157,411.

Patented Oct. 19, 1915.

WITNESSES:
O H Rauch
Gladys Jamieson

INVENTOR
Edwin C Morine
BY
Geo E Kirk
ATTORNEY

UNITED STATES PATENT OFFICE.

EDWIN C. MORINE, OF TOLEDO, OHIO, ASSIGNOR, BY MESNE ASSIGNMENTS, TO KRYPTOK COMPANY, OF NEW YORK, N. Y., A CORPORATION OF NEW YORK.

LENS MANUFACTURING.

1,157,411.  Specification of Letters Patent.  Patented Oct. 19, 1915.

Application filed September 16, 1912.  Serial No. 720,483.

*To all whom it may concern:*

Be it known that I, EDWIN C. MORINE, a subject of the King of Great Britain and Ireland, residing at Toledo, Lucas county, Ohio, have invented new and useful Improvements in Lens Manufacturing, of which the following is a specification.

This invention relates to the positioning and uniting of glass elements.

This invention has utility when embodied in built up lenses, as lenses of the bifocal type, especially in the instances in which the elements are to be fused together.

Figure 1:
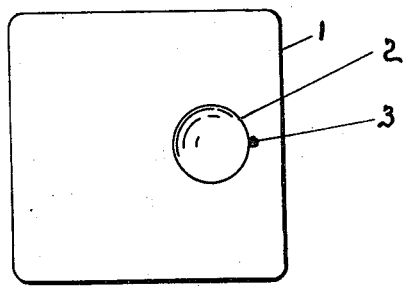
Figure 2:
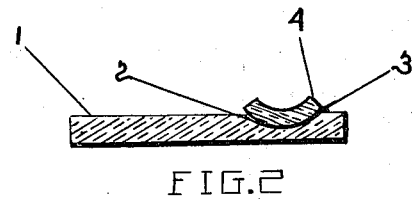
Figure 3:
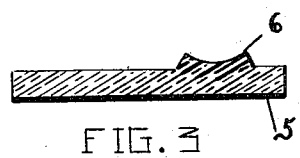
Figure 4:
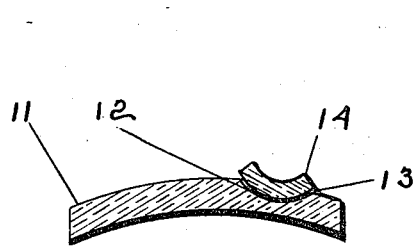
Figure 5:
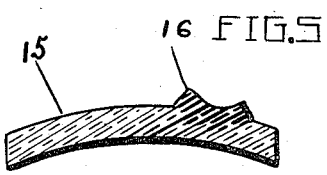
Figure 6:
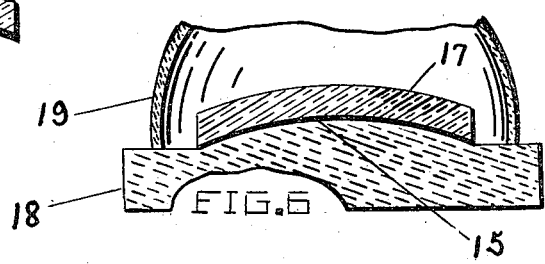

Referring to the drawings: Figure 1 is a plan view of a lens blank element; Fig. 2 is a sectional view of lens elements embodying the invention; Fig. 3 is a view similar to Fig. 2 after the fusing has occurred; Fig. 4 is a view similar to Fig. 2 of the elements for a toric lens instead of for plane lens; Fig. 5 is a view similar to Fig. 4 after the fusing has occurred; and Fig. 6 is a view in section of the toric lens after the fusing and grinding off of the excess portion of the auxiliary flint glass lens element to accord with the surfaces of the main crown glass lens element or blank.

The lens element or blank 1, in the manufacture of bifocal lenses, is provided with a seat 2 therein. Adjacent this seat 2, and preferably just outside thereof, is deposited a portion of cement 3, which serves as a shoulder against which may rest the second lens element 4 to effectively position the parts for fusing in the exact predetermined relation. The cement, by adhering to the element upon which deposited, is not subject to accidental shifting and thus displacement of the parts. The cemented shoulder may be of contour and extent to insure ready placing of the second lens element in the proper position in the seat, while additionally it may serve to adhere to each of said elements. With the shoulder or adhering cement to position the lens elements, the handling thereof, as in placing in a furnace for the fusing, may be effected with the assurance that the elements are maintained in their proper relative positions for the fusing action to occur.

In the fusing operation the lens element 1 is converted to the element 5, having no seat, but with the second lens element 3 converted to the integral section 6 in the position formerly occupied by the seat and the integral bifocal lens is ready for the finishing grinding operations.

Instead of the flat lens element 1, toric lens blank 11, or any other desired lens blank may be used. For bifocal lens manufacture, the toric blank 11, is provided with the seat 12 with the shoulder 13 adjacent thereto for positioning the second lens element 14 in the seat 12. Upon fusing, the toric lens element 11 is converted into the element 15 having the second lens element 14, integral therewith as the section 16. In finishing, this fused-in section is ground off to form section 17 integral with the lens element 15.

It is to be noted the cement, which may conveniently be of water glass, is not only one most easily and definitely applied, but requires no special handling of the lens elements either before or after fusing, as to either forming of the elements or removal of the cement or shoulder. The result is accuracy in manufacture at a minimum of expense, and incidentally the production of a most superior article. Especial utility in this cementing occurs when the fusing is done with the blank on a block 18 and the work concealed by a cover 19 to keep off dirt or foreign particles. The work is then not within view from charging into the furnace when heating, until cooled. The extent of the cementing anchor or anchors may be such as to firmly maintain the parts in the desired relation.

What is claimed and it is desired to secure by Letters Patent is:

In the process of making bifocal lenses, the steps consisting in placing two lens blanks in opposed relation to each other, and inserting between them a cementitious body of definite size capable of maintaining the two blanks in a certain spaced relation to each other as well as to stick them together, and while thus held subjecting the two blanks to heat until they are welded together.

In testimony whereof I hereunto set my hand in the presence of two witnesses.

EDWIN C. MORINE.

Witnesses:
  GEO. E. KIRK,
  MAX C. ROTH.